United States Patent Office 3,516,348
Patented June 23, 1970

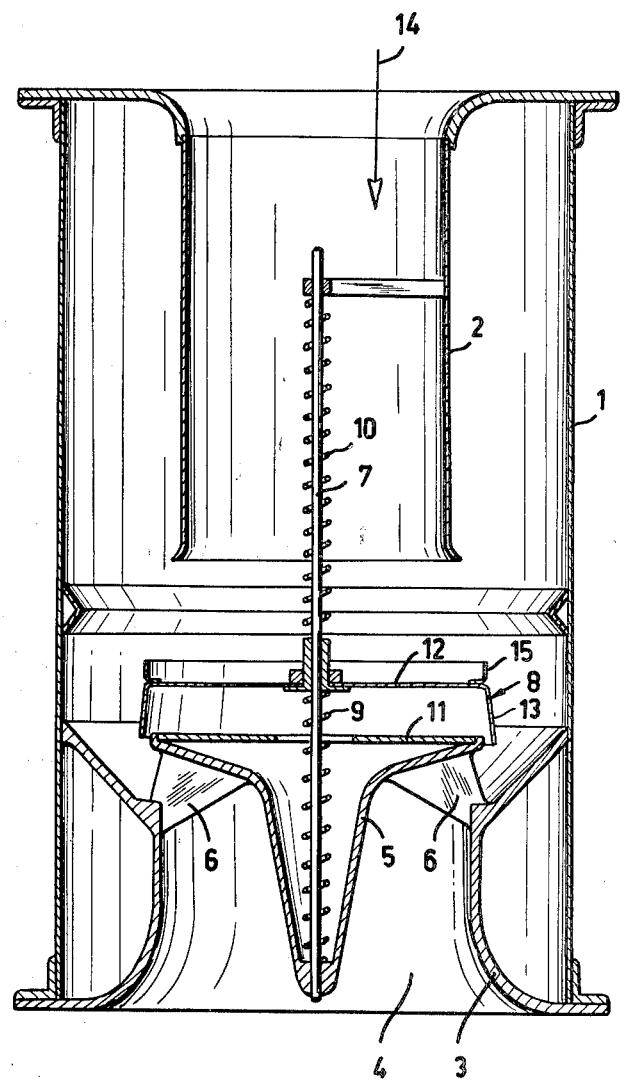

3,516,348
RAPIDLY CLOSING STOP VALVE FOR
AIR RAID SHELTERS
Launo Laakkonen, Risto Rytin tie 18, Helsinki 57, Finland, and Matti Purhonen, Riistavuorenkuja 8, Helsinki 32, Finland
Continuation of application Ser. No. 614,228, Feb. 6 1967. This application May 1, 1969, Ser. No. 822,101
Claims priority, application Finland, Feb. 14, 1966, 358/66
Int. Cl. F16k 17/18, 21/04
U.S. Cl. 98—119                                 6 Claims

ABSTRACT OF THE DISCLOSURE

A rapidly closing stop valve having a valve disc mounted in a channel to move to and from a position where an axially extending edge portion of the disc closes a plurality of air flow openings. A support member is provided for stopping the valve disc in its closing position, which support member has a continuous surface of the same configuration as the adjacent surface of the valve disc.

---

The present application is a continuation of our earlier application Ser. No. 614,228 filed Feb. 6, 1967, and now abandoned.

The present invention relates to a rapidly closing valve, which is intended particularly for air raid shelters and similar rooms and comprises an air channel and a valve disc, which is axially and slidably mounted therein, and which in case of a pressure wave is automatically moved by the immediate effect thereof in the direction of the pressure wave into a closed position, in which the disc closes air flow openings provided in the channel.

In previously known valves of this type the valve disc and the air flow openings are arranged in such a way that when the disc moves into its closed position it hits against a grate-like surface formed in the channel by the air flow openings, thus closing the air flow openings. Due to the fact that the closing motion of the valve disc is stopped against such a grate-like surface the valve disc is considerably deformed by the strong impact against the surface because the disc is partially forced into the air flow openings. Because of the deformation the disc must be replaced after the occurrence of a pressure wave.

The present invention is designed to eliminate said disadvantages and the rapidly closing stop valve according to the invention is characterized in that a smooth supporting surface essentially without openings is arranged for the valve disc in the air flow channel, against which surface the body part of the valve disc hits with the major part of its surface to stop the closing motion of the valve disc, and that the edge portion of the valve disc, which closes the air flow openings when the disc lies against said supporting surface, is arranged essentially in the direction of the pressure wave.

By arranging a smooth supporting surface without openings in the air flow channel, apart from the air flow openings, against which surface all of the body part of the valve disc hits when the valve closes, the valve disc can be stopped without risk of deformation, because the supporting surface can be shaped to support the body part of the valve disc evenly across the whole surface. Thanks to the fact that the closing motion of the valve disc is stopped by a special supporting surface, there is no need for the edge portion of the valve disc, which closes the air flow openings, to hit against the gratelike surface portion formed by the air flow openings, but the edge portion of the valve disc can be arranged to move loosely upon the air flow openings to close them during the closing phase. The edge portion of the valve disc, which closes the air flow openings, is thus completely relieved of the effect of said pressure impact and consequently of dynamic stresses, whereby the danger of deformation is avoided even in front of the air flow openings. Due to the fact that the whole surface of the body part of the valve disc is caused to hit evenly across the uniform supporting surface, the strength requirements on the disc may be essentially smaller, and therefore the disc may be light and rapidly closing. The edge portion of the valve disc can be dimensioned to stand only the static stresses caused by the pressure wave.

Because the grate, which in known valve constructions is necessary to stop the disc and causes a considerable flow resistance, can be eliminated in the construction according to the present invention, and the aforesaid supporting surface, which stops the valve disc, can be adequately supported only by means of a few ribs, the construction according to the invention helps to achieve a considerably lower total resistance in the valve than is possible with known grate-type valves.

The invention is described in greater detail below with reference to the accompanying drawing, which shows a preferable embodiment of the rapidly closing stop valve according to the invention.

The valve according to the drawing comprises a cylindrical air flow channel 1, and attached to one end of the channel a central inlet tube 2, which projects somewhat into the channel 1. An outlet tube 3 is attached to the other end of the channel, and it comprises an outlet opening 4, which is in connection with the inside of the channel through air flow openings 6 positioned between the outlet tube and a nave element 5 supported by the outlet tube. The nave element supports a central axle 7, which projects into the channel and is attached to a valve disc 8, which is concentric with and movable along the axle 7, and is normally held at a certain distance from the air flow openings 6 by means of the springs 9, 10. Thus the valve disc can move along the axle in both directions, whereby the valve disc in one end position closes the air flow openings and in the other end position closes the inlet tube 2.

According to the present invention the nave element 5 is provided with a plane, circular supporting surface 11, which is perpendicular to the axle 7 of the valve disc and concentric therewith. This supporting surface is smooth and without openings excepting a central opening for the axle of the valve disc. According to the invention the valve disc 8 comprises a disclike body part 12, which is of the same size, shape and orientation as the supporting surface 11 and which at its center is attached to the axle 7, and an edge portion 13, which projects from the plane of the body part towards the outlet tube 3 and extends around the whole periphery of the body part. In the illustrated embodiment the edge portion widens slightly and its axial dimension corresponds more or less to the axial dimension of the air flow openings 6.

A pressure wave rushes into the valve through the inlet tube 2 in the direction of the arrow 14 and hits the valve disc 8, which receives a closing impulse. The valve disc then moves towards the outlet valve 3 until the body part of the valve disc hits the supporting surface 11, which stops the closing movement of the valve disc. Because the supporting surface is essentially smooth and without openings, and because the body part is pressed evenly across said surface by the impact, the body part is not at all deformed by the impact. When the valve disc moves toward the closing position the edge portion 13 of the valve disc is moving in front of the air flow openings 6 without touching them in such a way that the edge portion completely closes the openings when the body part lies against the supporting surface. Then the free periphery of the edge portion almost touches the outlet tube 3. It may be observed that the edge portion of the valve disc is not subject to any deformation when the valve disc is closed and the edge portion is only subject to the static stresses caused by the pressure wave, when the edge portion prevents the pressure wave from continuing through the air flow openings.

As may be seen from the drawing, the periphery of the body part of the valve disc is provided with an edge 15, which is turned towards the inlet tube 2. It has been proved by tests that such an edge decreases the flow resistance of the air passing by the valve disc.

The drawing and the specification relating thereto are only intended to illustrate the idea of the invention. The details of the valve according to the invention may vary considerably within the scope of the patent claim. The supporting surface must not for instance necessarily be plane according to the drawing, but it may also be curved, cone-shaped or the like. In this connection the words "smooth" and "without openings" mean that there are no actual elevations, recesses or openings in the supporting surface, unless the body part of the valve disc is provided with corresponding elevations, recesses or openings.

We claim:

1. A rapidly closing stop valve comprising an air flow channel, means defining a plurality of substantially unobstructed air flow openings through said channel and having a peripheral abutment on the downflow side of said openings, a lightweight valve disc mounted for axial slidable movement in said channel, said valve disc having an axially depending peripheral skirt portion and being responsive to pressure waves through said channel to move axially in said channnel in the direction of said pressure waves, the ratio of the length of said skirt to the axial height of said openings being 1:1, and a support member fixed within said channel substantially level with the upflow side of said air flow openings, said support member having a substantially smooth surface of the same configuration as the adjacent surface of said valve disc, so that upon said axial movement of said valve disc, said surfaces engage to stop said valve disc in a position where said skirt portion of said valve disc closes said air flow openings by its free edge sealingly contacting said peripheral abutment.

2. The valve of claim 1, wherein said air flow openings extend in the general axial direction of said channel.

3. The valve of claim 1, wherein said means defining said air flow openings includes said support member.

4. The valve of claim 1, further comprising resilient means urging said valve disc in a direction opposite to the direction of said pressure waves.

5. The valve of claim 1 further comprising a second peripheral skirt extending from said valve disc in the upflow direction, an inlet tube in said channel of substantially the same configuration as said second peripheral skirt and normally spaced therefrom, whereby a reverse flow of air through said valve will cause said valve disc to move until said second peripheral skirt sealingly closes said inlet tube.

6. The valve of claim 1, wherein said support member is substantially flat.

References Cited
UNITED STATES PATENTS

| | | | |
|---|---|---|---|
| 3,075,448 | 1/1963 | Cohen | 98—119 XR |
| 3,140,648 | 7/1964 | Bergman et al. | 98—119 |

MANUEL A. ANTONAKAS, Primary Examiner

U.S. Cl. X.R.

137—517